S. Gardiner Jr.
Telegraph Key.
Nº 71,158.   Patented Nov. 19, 1867.
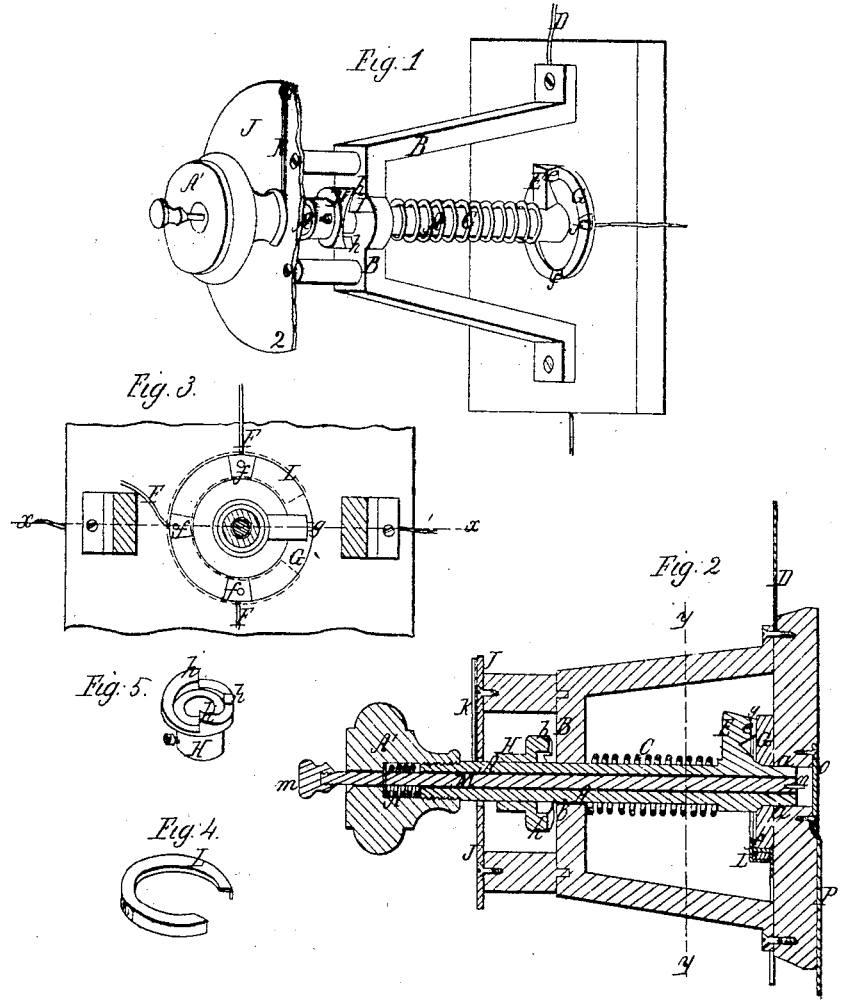
Witnesses;
Chas. D. Smith
J.E.M. Bowen
Inventor;
Saml. Gardiner Jr.
By Knight Bros.

United States Patent Office.

SAMUEL GARDINER, JR., OF NEW YORK, N. Y.

Letters Patent No. 71,158, dated November 19, 1867.

---

IMPROVEMENT IN ELECTRIC SWITCHES.

*The Schedule referred to in these Letters Patent and making part of the same.*

---

TO ALL WHOM IT MAY CONCERN:

Be it known that I, SAMUEL GARDINER, Jr., of New York, New York county, State of New York, have invented new and useful Improvements in Electric Switches and Keys; and I do hereby declare the following to be a full, clear, and exact description of the same, which will enable others skilled in the art to make and use the same, reference being had to the accompanying drawing, forming part of this specification.

Figure 1 is a perspective view of a combined switch and key for both turning on and off and lighting gas, and applicable also for signal purposes, as will be hereinafter explained.

Figure 2 is a longitudinal section of the same at $x\,x$, fig. 3.

Figure 3 is a transverse section at $y\,y$, fig. 2.

Figure 4 is a perspective view of a connecting-plate employed to communicate a succession of impulses to a single apparatus for turning on and off gas or for other purposes.

Figure 5 is a perspective view of the working-face of a cam-collar employed to automatically open and close the circuit by the rotation of a shaft.

Similar letters of reference indicate corresponding parts in the different views.

The subject of my invention is an electric switch or combined switch and key adapted for turning on and off and lighting gas, ringing bells, signalling on railroad trains, or for other purposes.

My invention consists, first, in the provision in a rotary spring-switch of a cam by which the circuit-closer is mechanically withdrawn from its bearing to avoid friction when the switch is rotated; second, in a provision whereby a number of successive impulses may be mechanically imparted by a simple rotation of the switch; third, in the combination of a lighting-key with a switch whose rotation communicates several distinct impulses to turn gas on or off; fourth, in the provision of an indicator to show the position of the circuit-closer in a rotary switch.

In the drawings, A represents a shaft journalled in bearings $a\,b$, so as to be capable of free rotation and a limited longitudinal motion, a spring, C, serving to return and press it home into its inner bearing $a$. A' is a knob by which to turn the shaft A. D may represent the electric main or connection with the positive pole of the battery. This wire is in electrical communication with the bridge B, in which is the outer bearing $b$ of the shaft A. E represents an arm, projecting from the shaft A, and provided with a platinum face or edge at $e$, by which the shaft A, and thereby the main circuit or positive wire, is brought into electrical connection with any one of a series of negative wires, F F F, each of which may communicate with a section of burners, to be ignited at one operation. In its normal or inactive position, the arm E rests in a recess, $g$, in an insulating ring or disk G, within which are embedded metallic plates $f\,f\,f$, connected with the respective wires F F F. H represents a collar or projection on the shaft A, forming one or more cams, $h\,h\,h$, corresponding in number with the negative wires F F F, or with the number of impulses which it may be desired to communicate to an electro-magnet or other single apparatus, under a modification of the switch which I shall presently describe. As the shaft rotates, the cams $h\,h\,h$, working over a projection, I, on the bridge B, or other fixed object, impart endwise motion to the shaft, in opposition to the spring C, so as to retract the arm E from the successive plates $f\,f$, and permit it to be returned to each of them in succession by the action of the spring C, so that the electric connection is broken and closed by the simple rotation of the shaft, without any friction upon the platinum edge. I thus entirely overcome the great difficulty which results from the wearing of the platinum connection in rotary electric switches as heretofore constructed. J represents a dial with figures corresponding with the several wires F F F, so that a pointer, K, on the shaft A, will indicate which of the sections is in connection, and when on zero will indicate that the circuit is broken.

For communicating a succession of impulses to a magnetic stop-cock for turning gas on or off, I employ a crescent-shaped plate, L, which may cover the disk G, as indicated by red outline in fig. 3, and is of sufficient length to receive the arm at all parts of its rotation excepting for a sufficient space at $g$, to permit the arm to rest on the insulator G, so as to keep the circuit open. In this case the collar H may have one-fourth as many cams, $h$, as there are teeth on the ratchet-wheel of the gas-cock, so that a complete rotation of the shaft A will impart the required number of impulses to the magnetic engine to rotate the gas-cock ninety degrees and thus turn the gas completely on or off. When the apparatus is thus used for turning gas on or off I make the knob A' and shaft A hollow, as shown in the drawings, and employ a lighting-key, consisting of a rod, M, fitted to slide longitudinally within the knob and shaft, and pressed outward by a spring, N. The projecting outer end of the rod M has a button or knob, m, to which the finger of the operator is applied to press it in, and when thus pressed in, a platinum point, n, on its inner end, by coming in contact with a plate, O, in electric connection with the negative lighting-wire P, closes the circuit and lights simultaneously all the burners of the chandelier, or any section or series of burners, which may be controlled by the turning-switch A E H.

The apparatus, under the general form first described, is well adapted for ringing bells in hotels, dwellings, and other places. For this purpose I prefer to have two insulating points in the disk, with corresponding zero marks on the dial, and two conducting points at opposite places on the disk, so that when the arm is resting on the insulator, with the wires at either zero mark, one-half a revolution of the shaft will close the circuit so as to ring the bell and again open it in readiness for the next occasion. The two connecting-wires may be joined to a common electro-magnet, the armature of which is connected to the hammer of the bell. When desired, a single bell can be used for all the apartments, and the electro-magnet, as well as actuating the bell-hammer, can be made to indicate, by pointing to or exposing a number, or in any other suitable way, the apartment to which it belongs.

For signalling on railway trains, I employ a switch, of the construction last described, at any convenient place or places in each car, preferably one at each end of the car, near the door. The insulated wires will pass down to a protected position beneath the car, and may be provided with cups and screws, or any suitable means by which to connect and disconnect them from car to car, as the latter are coupled and uncoupled, or, if preferred, an insulated attachment may be applied to the car-couplings, by which the electric connection of the insulated wires may be effected automatically in the act of coupling the cars. To insure the effectiveness of the return circuit, without depending on the rails, wheels, and car-frames, I propose to run common, naked wires from end to end, beneath each car, connecting with the coupling-irons, and also with the negative or return wires of the switches. The battery may be located in the tender or in any other part of the train, and the wire of course connects with an electro-magnet to actuate a bell-hammer in the cabin of the locomotive.

I thus provide an effective, reliable, and convenient mode of signalling on railway trains, instead of the uncertain and inconvenient bell-cord in common use. It is well known that with the common bell-cord, the pulling in of the slack and imparting the proper number of jerks to the hammer, consumes from fifteen to thirty seconds before any intelligence can be communicated to the engineer; whereas with my apparatus the desired signal can be conveyed instantaneously and reliably, and it is manifest that by thus avoiding mistakes and loss of time, serious destruction of life and property may often be prevented. The convenience and effectiveness of my signal apparatus will also avoid the necessity of the conductor signalling the engineer from the ground by hand or by lantern, as is now commonly practised on starting. By my device the conductor, without leaving his post of duty on board the train, can communicate any necessary signal with so much ease and certainty that he will seek no other means of doing so.

For some purposes the shaft A may have but a partial rotation, the spring serving, as before, to hold it down to its seat, and insure the effective metallic connection of the arm E with the conducting-plate or wire.

Having thus described my invention, what I claim as new, and desire to secure by Letters Patent, is—

1. The shaft A and arm E, constituting an electric switch held to its bearing by a spring, C, to insure effective metallic connection, substantially as described.

2. The cam-collar H, employed to withdraw the switch from its bearing in the act of rotation, as explained.

3. The conducting-plate L, employed in combination with the rotary switch A E, and cam-collar H, to impart a given number of impulses by a simple rotation of the switch, as set forth.

4. The lighting-key M, in combination with the gas-turning device A E C H L, for the purposes set forth.

5. The combination of the indicating dial J and index K with the rotary switch A E, as and for the purpose set forth.

SAM'L GARDINER, Jr.

Witnesses:
OCTAVIUS KNIGHT,
J. E. M. BOWEN.